United States Patent

[11] 3,597,989

| [72] | Inventor | Everett H. Benson |
| | | Rte 1, Box 429, Eagle Creek, Oreg. 97022 |
| [21] | Appl. No. | 11,642 |
| [22] | Filed | Feb. 16, 1970 |
| [45] | Patented | Aug. 10, 1971 |

[54] ANGULAR DRIVE MECHANISM
5 Claims, 5 Drawing Figs.

[52] U.S. Cl. ................................................ 74/385, 74/384
[51] Int. Cl. ..................................................... F16h 35/06, F16h 1/26, F16h 1/48
[50] Field of Search ........................................ 74/380, 385, 384

[56] References Cited
UNITED STATES PATENTS

| 2,050,497 | 8/1936 | McCollum ..................... | 74/385 |
| 2,235,427 | 3/1941 | Harris ............................ | 74/385 |
| 2,445,828 | 7/1948 | Heinsohn, Jr. .................. | 74/385 |
| 2,672,762 | 3/1954 | Northcote ....................... | 74/385 |
| 3,261,223 | 7/1966 | Vertut ............................ | 74/380 |

*Primary Examiner*—Leonard H. Gerin
*Attorney*—Buckhorn, Blore, Klarquist and Sparkman ABSTRACT: An angular drive mechanism between two rotatable shafts includes a shaft connection member on the end of each shaft which is relatively rotatable with respect to such shaft about the axis of rotation of such shaft. A pivotal connection structure between these shaft connection members includes either one or two pivot elements with axes at right angles to the axes of rotation of the shafts. A bevel gear secured to the end of each shaft is journaled on a shaft connection member and meshes with bevel gears on the opposite ends of a pivot element. A direct drive modification has an intermediate connection member pivotally connected between the shaft connection members by two spaced pivot elements having parallel axes. Spur gears secured to the bevel gears on the respective ends of the pivot elements mesh with each other. A reverse drive modification has a single pivot element. An angular relationship between the longitudinal axes of any two of the connection members about the axis of a pivot element will prevent rotation of the pivotal connection structure about the axis of either shaft.

Patented Aug. 10, 1971

EVERETT H. BENSON
INVENTOR

BY

BUCKHORN, BLORE, KLARQUIST & SPARKMAN
ATTORNEYS

Patented Aug. 10, 1971
3,597,989
3 Sheets-Sheet 2
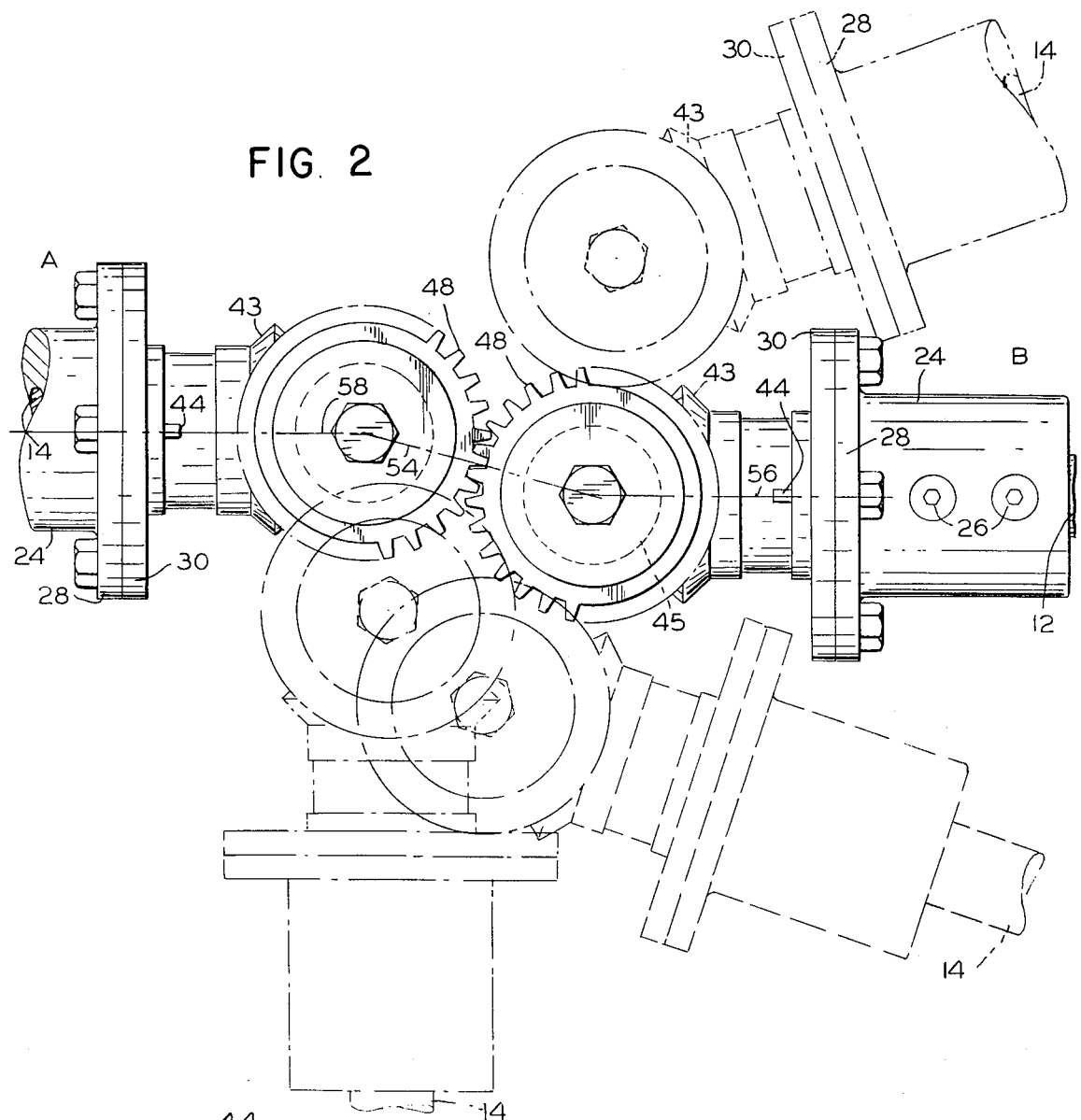
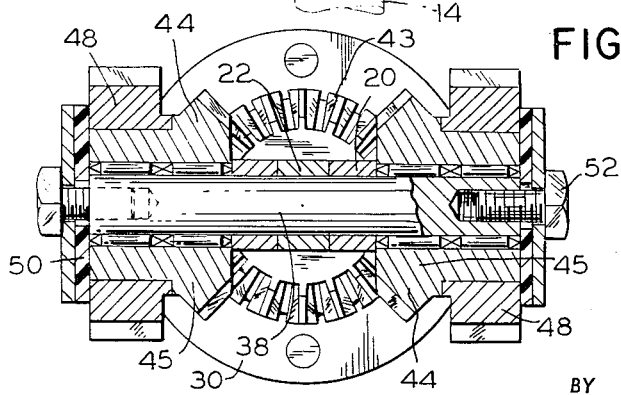
EVERETT H. BENSON
INVENTOR
BY
BUCKHORN, BLORE, KLARQUIST & SPARKMAN
ATTORNEYS Patented Aug. 10, 1971

EVERETT H. BENSON
INVENTOR

BY
BUCKHORN, BLORE, KLARQUIST & SPARKMAN
ATTORNEYS

3,597,989

ANGULAR DRIVE MECHANISM

BACKGROUND OF THE INVENTION

Angular drive mechanisms between the ends of two shafts have, in general, been of the bevel or miter gear type or of the universal joint type. The bevel gear type provides a fixed angle which can only be varied by substituting a new set of gears, while the universal joint type has been limited to an angular deviation of the rotational axis of one of the shafts from the rotational axis of the other shaft which is substantially less than 90°. Any greater angle between the axes of the shafts requires series of universal joints between shaft sections with intermediate supporting bearings for such shaft sections.

Various geared types of angle drive mechanisms between the ends of shafts have been suggested but these, in general, require an external torque resisting connection or support for an intermediate element of the drive mechanism in order to provide an effective drive between the shafts, particularly when the drive is a reverse drive.

In accordance with the present invention an adjustable or variable angular drive mechanism between the ends of two shafts is provided which enables the angle between the shafts to be varied from a small angle to angles substantially greater than 90°, and which eliminates any requirement for the external torque-resisting connection or support referred to above. Modification of the angular drive mechanism provide either a direct drive or a reverse drive.

BRIEF DESCRIPTION OF THE DRAWINGS

FIG. 2 is a side view of the drive of FIG. 1 also showing various angular relationships of the shafts, coupled by the drive mechanism, in phantom view;

FIG. 3 is a vertical sectional view taken on the line 3-3 of FIG. 1;

DESCRIPTION OF PREFERRED EMBODIMENT

Figure 1:
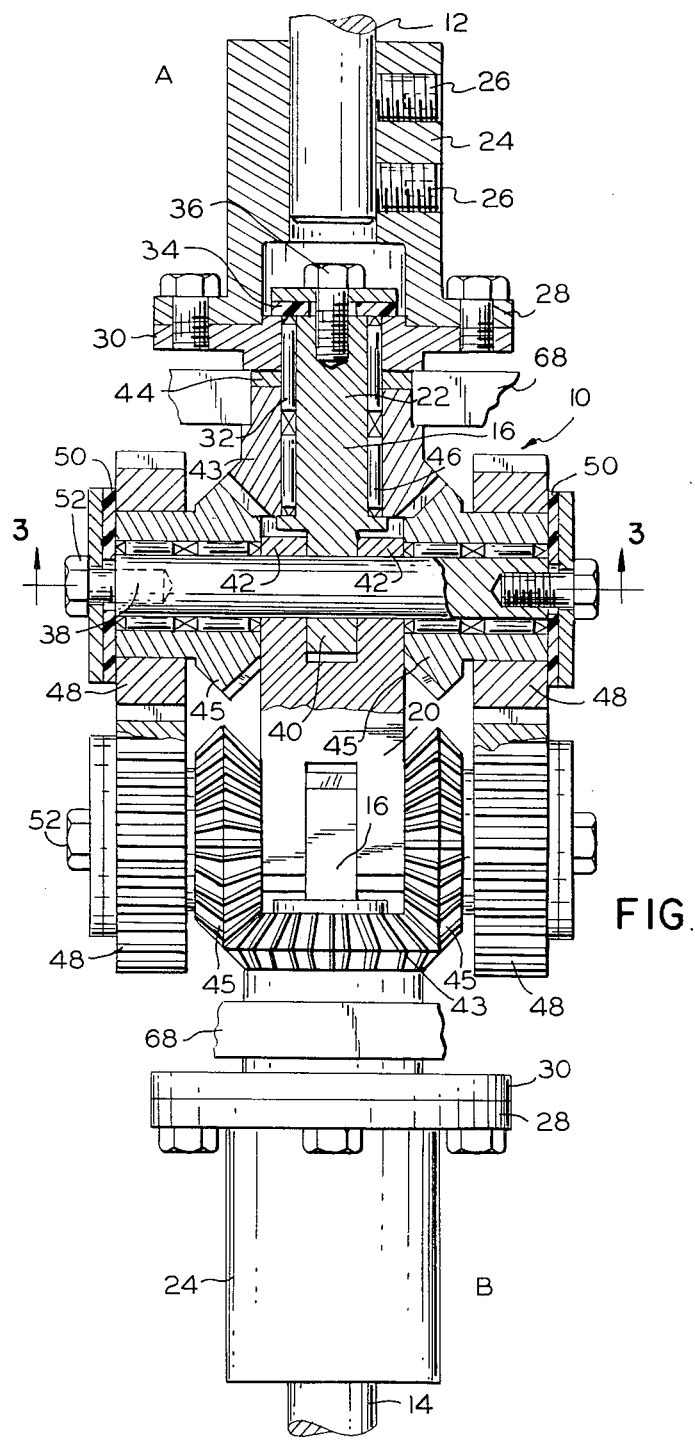
FIG. 1 is a top view of a preferred embodiment partly in plan and partly in horizontal section.

The angular drive mechanism shown in FIGS. 1 to 3 is shown as being connected between the ends of two rotatable shafts 12 and 14. This drive mechanism includes a shaft connection member 16 having one end connected to the shaft 12 and a similar shaft connection member 16 having one end connected to the shaft 14. The drive mechanism also includes an intermediate connection member 20 extending between the ends of the shaft connection members 16 and having its end pivotally connected to such members. The shaft connection members 16 are identical and are connected in the same manners to the respective shafts 12 and 14 so that only one of these shaft connection members will be described.

The shaft connection member 16 has a body portion 22 in the form of an elongated circular cylinder having its longitudinal axis in alignment with the axis of rotation of the shaft 12 and is connected to the shaft 12 for relative rotation in between the shaft 12 and the shaft connection member 16. Thus, a sleeve member 24 fitting and rigidly connected to the end of the shaft 12 by setscrews 26 is provided with an end flange 28 concentric with the shaft 12. A collar 30 also concentric with the shaft 12 is secured to the flange 28 and surrounds and is journaled on the body portion 22 of the shaft connection member 16 by needle bearings 32. The collar 30 is held in position axially of the shaft connection member 16 by a thrust washer 34 secured to the end of the shaft connection member 16 by a machine screw 36. It will be apparent that the body portion 22 of the shaft connection members 16 is held in axial alignment with the shaft 12 and that the shaft 12 can rotate with respect to the shaft connection member 22.

A pivotal connection between the shaft connection member 16 and the intermediate connection member 20 is provided by a pivot element 38. This pivot element extends through and fits aligned apertures in a projection 40 on the end of the shaft connection member 16 remote from the collar 30 and in laterally spaced arms 42 of a yoke portion on an end of the intermediate connection 20. The projection 40 has parallel sides and fits between parallel inner faces of the arms 42 of the intermediate connection member 20. The inermediate connection member 20 can thus pivot about the axis of the pivot element 38 with respect to the shaft connection member 16 but is constrained against any other motion with respect to this shaft connection member.

A bevel gear 43 is also journaled on the body portion 22 of the shaft connection member 16 by needle bearings 32 and 46 and is driven from the shaft 12 through the sleeve 24 and collar 30. Thus the collar 30 has a driving lug or key portion 44 as shown in FIG. 2 which extends axially of the shaft connection member 16 into a notch or keyway in the end of the bevel gear 43. Bevel gears 45 are also journaled on the ends of the pivot elements 38 so as to mesh with the bevel gear 43. It is apparent that rotation of the shaft 12 and bevel gear 43 with respect to the shaft connection member 16 will cause rotation of the bevel gears 45 about the pivot element 38 and vice versa.

Each of the bevel gears 45 has a spur gear 48 secured thereon concentric with such bevel gear for rotation with the respective bevel gear 45. Each of the gear assemblies including a bevel gear 45 and spur gear 48 is held in position upon the pivot element 38 by a thrust washer 50 and machine screw 52.

The description of the angle drive mechanism of FIGS. 1 and 3 thus far relates to one-half only of such drive mechanism, namely, the upper half in FIG. 1 and the right half in FIG. 2. The other half, namely, the lower half of FIG. 1 and the left half of FIG. 2 is a mirror image of the half of this drive mechanism just described and will not be described in detail. The same reference numerals employed above for the first half of the angular drive mechanism have been applied to the drawings to the second half of such drive mechanism in FIGS. 1 and 2. The spur gears 48 on the beveled gears 45 of the half of the angle drive mechanism described above mesh with the spur gears 48 on the bevel gears 45 of the other half so that a direct drive from the shaft 12 to the shaft 14 or vice versa is established through the bevel gears 43 an 45 and the spur gears 48. The two shaft connection members 16 and the intermediate connection member 20 form a pivotal connection structure between the ends of the shafts 12 and 14 which is disposed centrally of the angle drive mechanism which extends through the bevel gears 43 and between the pairs of bevel gears 45.

If the longitudinal axes of either shaft connection member 16 is disposed at an angle to the longitudinal axis of the intermediate shaft connection member 20 about one of the pivot elements 38, the shaft connection members 16 will not rotate with its respective shaft 12 or 14. This means that the entire angular mechanism including the intermediate connection member 20 will not rotate with the shafts 12 and 14. Such an angular relationship can be fixed in the angular drive shaft connection mechanism itself, as illustrated in FIG. 2, where the centerline or longitudinal axis of the intermediate connection member 20 is indicated by the dash-dot line 54 and the axes of rotation of the shafts 12 nd 14 are indicated by the dash-dot lines 56 and 58, respectively. These lines 56 and 58 are also the longitudinal axes of the shaft connection members 16 connected to the respective shafts.

The particular angular relationship between the longitudinal axes 54, 56 and 58 of the connection members 16 and 20 in FIG. 2 obtains only when the lines 56 and 58 are parallel, i.e., the axes of rotation of the shafts 12 and 14 are parallel as are also the longitudinal axes 56 and 58 of the connection members 16. The angular relationship between the axis of rotation of the shafts 12 and 14 can however be changed at will by merely angularly moving one of the shafts, for example, to one of the alternate positions shown in phantom view in FIG. 2. That is to say, one of the gears 48 will merely roll around on the other gear 48 without producing any rotation of any of the other gears about their axes, or any relative rotation between the shafts 12 and 14. During such movement one or the other of the longitudinal axes 56 or 58 of the shaft connection member 16 may become aligned with the longitudinal axis 54 of the intermediate connection member 20, but not both, so that there is always an angle between the longitudinal axis 54 of the intermediate connection member 20 and one of the longitudinal axes 56 or 58 of the shaft connection member 16. The shaft connection mechanism will, therefore, not rotate as a result of a rotative drive between the shafts.

The right angular relationship between the shafts 12 an 14 shown by the lowermost phantom view of the shaft 14 in FIG. 2, is not the limit of the angle between the two shafts with the angular setting between the axes 54, 56 or 58 illustrated in FIG. 2. This limit is set only by interference between the flanges 28 or collars 30 on the two shafts as illustrated by the position of the shaft 14 and its associated flange 28 and collar 30 in the uppermost phantom view in FIG. 2. At all relative positions of the shafts 12 and 14 shown in FIG. 2, rotation of one shaft will cause corresponding rotation of the other shaft to provide a direct drive between the shafts. Thus the shaft 14 can be moved angularly with respect to the shaft 12 from a position which the shaft 14 is at the angle shown in the phantom view at the lower right-hand portion of FIG. 2 through the solid line position shown at the left portion of the drawing to the phantom view position shown in the upper right-hand portion of this figure. Such pivotal motion between the shafts 12 and 14 need not be in the plane of the paper of FIG. 2, since the entire angle drive mechanism including the two shaft connection members 16 and the intermediate shaft connection member will rotate about the longitudinal axes of either of the shaft connection members 16 so that the pivot axes of the pivot elements 38 are at right angles to the longitudinal axes of the shaft connection members 16. The angular relationship between the longitudinal axes 54, 56 and 58 of the various connection members 16 and 20, shown by the dash-dot lines 54, 56 and 58 of FIG. 2, when the axes of rotation of the shafts 12 and 14 are parallel, can be changed by removing one of the machine screws 52 and then removing one of the gear assemblies including a bevel gear 45 and spur gear 48. It is then possible to move one of the shafts 12 or 14 sidewise to change the angles between the axes 54, 56 and 58 and then reinstall the previously removed gear assembly to maintain the new angular relationship thus established. A greater angle between the axes 56 and 54 and the corresponding greater angle between the axes 58 and 54 reduces any tendency of the angle drive mechanism to rotate with one of the shafts but also limits the angle through which the shafts 12 and 14 can be pivoted relatively to each other.

If the angles between the axes 54, 56 and 58 with the shafts 12 and 14 aligned as shown in FIG. 2 is removed by removing a gear assembly as above described, aligning all of the longitudinal axes shown by the dash-dot lines 54, 56 and 58 and reinstalling the gear assembly, the shaft connection members 20 still will not rotate with their respective shafts 12 and 14 providing an angular relationship is maintained between the axes of rotation of the shafts 12 and 14. This angle between the shafts will also produce angles between the longitudinal axes 54 of the connection member 20 and the shaft connection members 16 due to rolling of one of the spur gears 48 around the other spur gear 48. This is the preferred type of operation where the particular environment in which the angle drive mechanism is employed will not permit the longitudinal axes of the two shafts 12 and 14 to come into exact longitudinal alignment with each other. If this exact longitudinal alignment does occur, the drive between the two shafts is still maintained but the connecting structure between the two shafts, including the shaft connection members 16 and the intermediate connection member 20, will then have all of their longitudinal axes in alignment with each other and with the longitudinal axes of the shafts 12 and 14. In this case the entire angular drive mechanism between the two shafts will rotate with the two shafts. This is not objectionable for low speed operation, even when the two shafts 12 and 14 can pivot with respect to each other, since pivotal misalignment of the shafts will merely cause the connecting mechanism between the ends of the shaft to stop rotating. With high-speed operation, even slight misalignment of the shafts will cause the rapidly rotating angular drive mechanism between the ends of the shafts to suddenly stop thus subjecting the certain parts of such mechanism to relatively large stresses.

Figure 4:
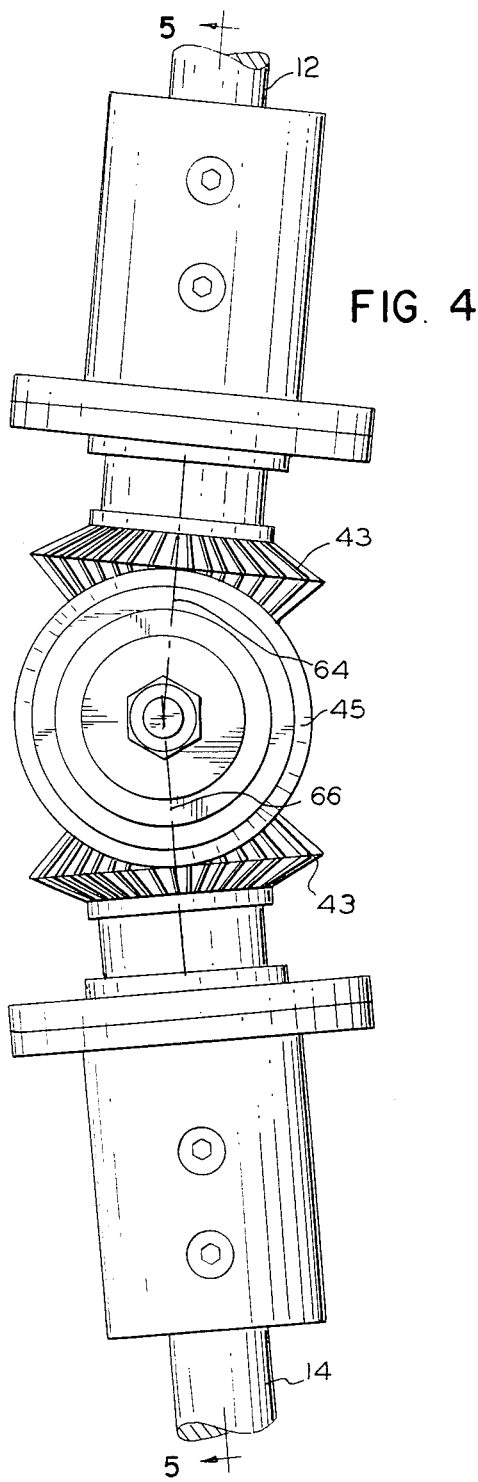
FIG. 4 is a side view of a modified angular drive mechanism.
Figure 5:
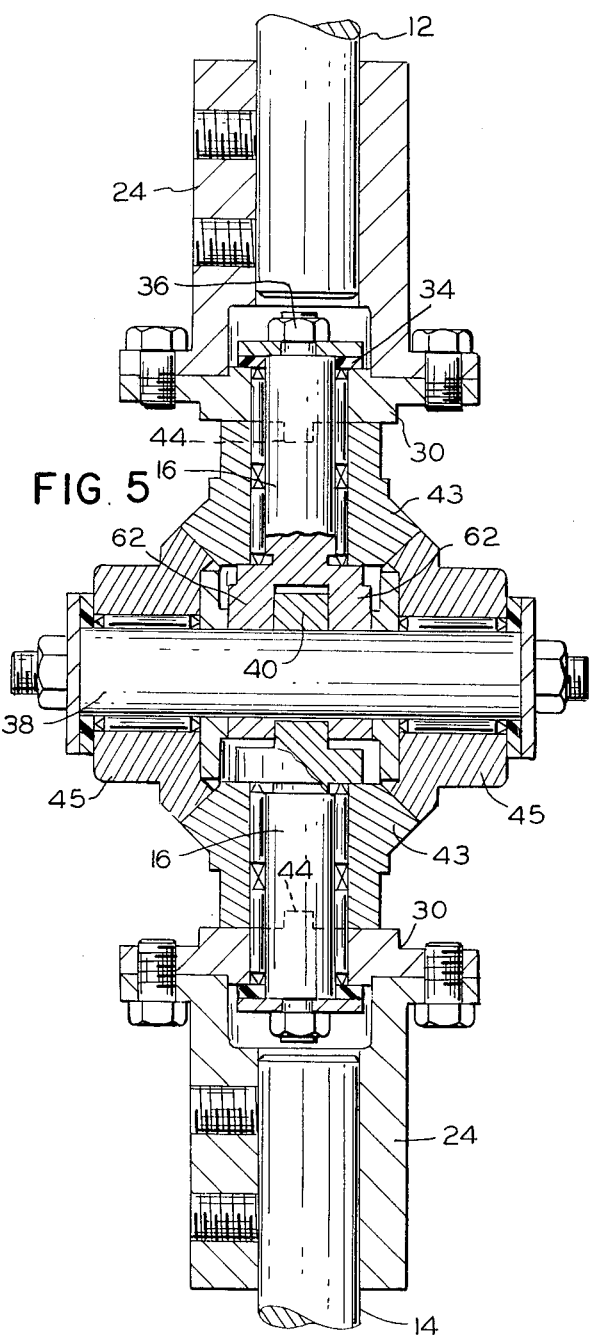
FIG. 5 is a sectional view taken on the line 5-5 of FIG. 4.

The modification of FIGS. 4 and 5 provides a reverse drive between the shafts 12 and 14 and it is of similar construction to the modification of FIGS. 1, 2 and 3. Thus all of the elements of FIGS. 4 and 5, with one exception, are the same as elements of FIGS. 1 to 3, and have been given the same reference numerals as the corresponding elements of FIGS. 1 to 3. The exception is the shaft connection member 16 connected to the shaft 12. This member is of slightly different construction than the shaft connection member 16 connected to shaft 12 in FIG. 3 in that it has a pair of arms 62 providing a yoke which receives and fits the projection 40 on the shaft connection member 16 connected to the shaft 14.

The shaft 12 of FIG. 3 and collar 30 journaled on the shaft connection members 16 drive a bevel gear 43 of the same type shown in FIGS. 1 to 3 and that another bevel gear 43 is driven from the shaft 14 in a similar manner. The bevel gears 43 both mesh with bevel gears 45 on the ends of a pivot element 30. The spur gears 48 of FIGS. 1 to 3 are not employed in the modification of FIGS. 4 and 5, nor is an intermediate connection member 20. As in the modification of FIGS. 1, 2 and 3, the two shaft connection members 16 provide a pivotal connection structure between the ends of the shafts 12 an 14 which is disposed centrally of the angle drive mechanism and extends through the bevel gears 43 and between the bevel gears 45.

In order to produce a drive between the shafts 12 and 14, the longitudinal axes 64 and 66 of the shaft connection members 16 must have at least a slight angle with respect to each other about the pivot element 38 as indicated in FIG. 4. This angular relation between the shafts 12 nd 14 can be set or changed by removing one of the bevel gears 45, arranging the longitudinal axes of the shaft connection member 16 at the desired angle and then resinstalling the previously removed gear 45. The only limitation to the angle between the shafts is interference between the two gears 43. It will be apparent that this angle must be set in discrete steps dependent upon the number of teeth on the various gears.

If the longitudinal axes of the shaft connection members 16 are allowed to become exactly aligned, the connecting drive mechanism between the two shafts 12 and 14 becomes an equivalent of a differential in which the bevel gears 45 on the pivot element 38 become the equivalent of the cage gears of the differential. This means that no torque will be transmitted through the drive mechanism. The driven shaft will tend to stop and the two gears 45 on the pivot element 38 and this pivot will revolve about the longitudinal axes of the shaft connection members 16 at half the speed of the driving shaft.

It will be apparent that one of the bevel gears 45 can be removed and a balancing member substituted therefor which has no gear teeth without affecting the nature of the drive between the shafts 12 and 14 through the angular drive mechanism except that the maximum torque which can be transmitted without damaging the mechanism will be approximately cut in half. Under these conditions, the angle between the shafts 12 and 14 can be freely varied between an angle which approaches but does not reach alignment of the two shafts and an angle which will cause the two gears 43 to interfere with each other.

No external connection between the two shafts 12 and 14 or any external support structure for the angular drive mechanism is required for either the modification of FIGS. 1, 2 and 3, or the modification of FIGS. 4 and 5. A flexible dust cover can however be employed as indicated by the elements 68 in FIG. 1, which may be the ends of such cover fitting around the ends of the bevel gears 43 which are remote from the teeth on such gears, the remainder of the dust cover being broken away.

I claim:

1. An angular drive mechanism for providing a driving connection between the ends of two shafts comprising:

pivotal shaft connection means including a plurality of elongated connection members arranged end to end;

pivot means including a pivot element pivotally connecting the ends of adjacent connecting members together about a pivot axis extending at right angles to and intersecting the longitudinal axis of adjacent connection members;

said connection members including a shaft connection member mounted on the end of each of said shafts for rotation about the longitudinal axis of said shaft connection member with respect to the one of said shafts upon which said connection member is mounted and with said longitudinal axes of said shaft connection member coincident with the axis of said one of said shafts;

gear means for establishing a drive between said shafts including at least one bevel gear mounted for rotation on an end of a pivot element and a bevel gear secured to the end of each of said shafts and meshing with at least one bevel gear mounted for rotation on the end of a pivot element, each of the shaft connection means extending through and rotatively supporting one of said bevel gears secured to one of said shafts;

and means for maintaining an angular relationship between the longitudinal axes of said adjacent connection members about said pivot axis to prevent rotation of said pivotal shaft connection means when said shafts are rotated.

2. An angular drive mechanism in accordance with claim 1 in which said pivotal shaft connection means also includes:

an intermediate connection member between said shaft connection members and pivot means and a pivot element connecting each end of said intermediate connection to an adjacent end of a shaft connection member;

a bevel gear is mounted for rotation upon an end of each of said pivot elements and meshes with a bevel gear secured to one of said shafts;

and a gear connection between said bevel gears on the ends of said pivot elements for providing a direct drive through said angular drive mechanism between said shafts.

3. An angular drive mechanism in accordance with claim 2 in which the means for maintaining angular relationship between the longitudinal axis of said adjacent connection members includes bevel gears on each end of each of said pivot elements with the bevel gears on one of said pivot elements meshing with the bevel gear secured to the end of one of said shafts and the bevel gears on the ends of the other of said pivot elements meshing with the bevel gear secured on the end of the other shaft;

and includes a spur gear connection between the bevel gears on each of the corresponding ends of said pivot elements.

4. An angular drive mechanism in accordance with claim 1 in which:

said pivotal shaft connection means includes a single pivot element pivotally connecting adjacent ends of said shaft connection members together;

and said bevel gear on said pivot element meshes with the bevel gears secured to the end of each of said shafts to establish a reverse drive through said connection means between said shafts.

5. An angular drive mechanism in accordance with claim 4 in which:

the means for maintaining an angular relationship between the longitudinal axes of said adjacent connection members includes a bevel gear on both ends of said pivot element meshing with the bevel gears secured to the end of each of said shafts.